Nov. 9, 1954  J. H. BABROS ET AL  2,693,786
DOOR FOR BIRD CAGES
Filed Nov. 2, 1953

JOSEPH H. BABROS,
JOSEPH KOMADA,
INVENTORS

BY Hazard & Miller
ATTORNEYS

United States Patent Office 2,693,786
Patented Nov. 9, 1954

2,693,786

DOOR FOR BIRD CAGES

Joseph H. Babros and Joseph Komada,
Los Angeles, Calif.

Application November 2, 1953, Serial No. 389,668

2 Claims. (Cl. 119—17)

This invention relates to improvements in bird cages, and particularly to doors therefor.

Explanatory of the present invention, many birds, particularly parakeets, are frequently removed from their cages and are permitted to fly or roam at will outside of the cage. It is desirable with such bird cages to provide a door through which ingress and egress is permissible and which is so designed that when the door is in fully open position that it will be in a self-supporting horizontal position extending outwardly from the bottom of the door opening so that it may function as a landing platform on which the bird may alight whenever it desires to reenter the cage.

A primary object of the invention is to provide an improved and highly simplified bird cage construction wherein the door for the bird cage will be hingedly mounted at its bottom so that it may optionally be caused to assume either a closed or open position and which is so designed that when the door is in fully open position it will be self-supporting in a horizontal plane.

More specifically, an object of the invention is to provide a door construction for bird cages in which parts of the cage and the door will be caused to perform double functions, that is, the structural parts of the cage and door and the hinge and stops as well.

With the foregoing and other objects in view, which will be made manifest in the following detailed description and specifically pointed out in the appended claims, reference is had to the accompanying drawings for an illustrative embodiment of the invention, wherein:

Figure 1:
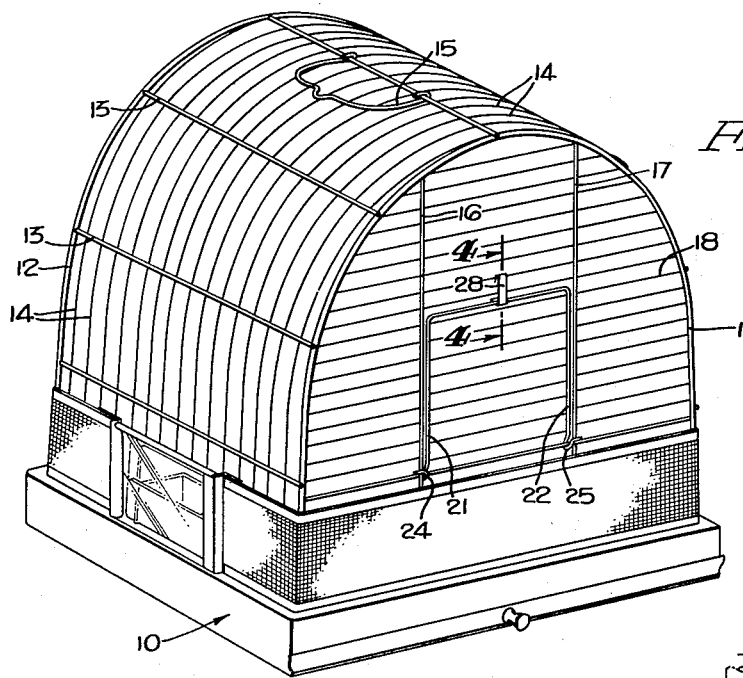
Figure 1 is a perspective view of a bird cage embodying the present invention.

Referring to the accompanying drawings wherein similar reference characters designate similar parts throughout, the improved bird cage consists of a suitable base, generally indicated at 10, which may conform to any conventional or preferred type of construction. On this base there are mounted two inverted U-shaped, relatively heavy wires 11 and 12. These wires are connected by longitudinally extending wires 13. Additional inverted U-shaped wires 14 are equally spaced between the wires 11 and 12 and are secured to the longitudinally extending wires 13. The topmost longitudinal wire 13 may have a handle 15 mounted thereon by which bird cage may be transported.

On the door side of the case there are vertical wires 16 and 17 which extend vertically from the top of the wire 11 downwardly to the base. These wires may have horizontal wires 18 extending thereacross and secured thereto as well as to the wire 11. The wires 16 and 17 perform a function not only of reenforcing the wires 18 but they also define the side boundaries of the door opening 19. The bottom of this door opening is defined by a horizontal wire 20 which may be one of the wires 18 but preferably is made of a somewhat heavier gauge wire than the wires 18. In this manner the door opening 19 may be regarded as being defined at its sides by the vertical wires 16 and 17 and at its bottom by the horizontal wire 20. The door is formed of an inverted U-shaped section of wire, the vertical sides of which are indicated at 21 and 22. These are connected by the integral top section 23.

The spacing between the side portions 21 and 22 is slightly less than the spacing between the wires 16 and 17. The lower ends of these portions are bent as at 24 and 25 to form loops which encircle the horizontal wire 20, thus forming a simple hinge by which the door is mounted on the wire 20 and can swing from fully open position to fully closed position or vice versa. The extreme ends of the portions 21 and 22, after having been looped about the wire 20 are bent outwardly or laterally as indicated at 26 and 27 so as to be engageable with the wires 16 and 17, respectively, below the wire 20. This engagement occurs when the door is in fully open position and causes the door to be self-supporting in a horizontal plane when it is open so that it may function as a landing platform on which the bird which has been released may alight whenever it desires to re-enter the cage.

As a means of latching the door in closed position a sheet metal latch 28 is provided which is preferably looped as indicated at 29 about the second wire 18 above the top of the door opening. This latch has an inwardly bent portion 30 that is convex on its upper side and which may be sprung beneath the top bar or crosspiece 23 to releasably hold the door in closed position whenever this is desired.

Figure 2:
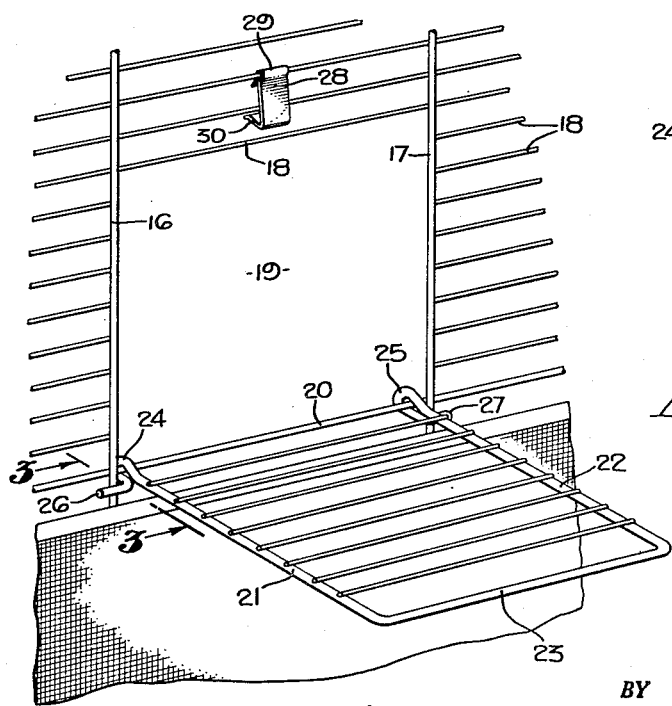
Fig. 2 is a partial view in perspective on a somewhat enlarged scale illustrating the door in its fully open position.
Figure 3:
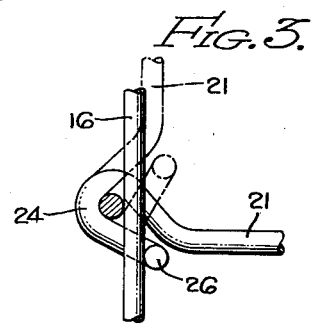
Fig. 3 is an enlarged sectional view, taken substantially upon the line 3—3 upon Fig. 2.
Figure 4:
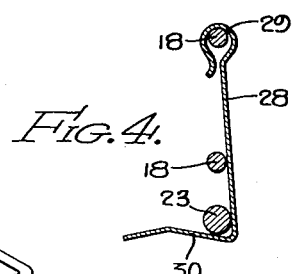
Fig. 4 is a sectional view taken upon the line 4—4 upon Fig. 1 to illustrate the type of latch that we preferably employ.

Some birds, such as parakeets, desire to climb about the walls of their cages, and in the present construction as the end walls of the cage are formed by horizontal wires 18 this climbing proclivity is facilitated. Whenever it is desired to open the cage to permit egress of the bird the latch is swung forwardly to disengage the door and the door is allowed to swing downwardly and outwardly until the engagement of the laterally bent portions 26 and 27 takes place with the wires 16 and 17, respectively. In this position, as depicted in Fig. 2, the door is self-supporting in a horizontal position.

In the construction of the cage the door is usually completely formed prior to its installation. The wire 20 is the last wire to be applied to the end of the cage and is passed or threaded through the loops 24 and 25 while the door is in the door opening and is subsequently spot-welded or otherwise secured to the wires 16, 17, and 11.

From the above-described construction it will be appreciated that an improved bird cage is provided having a door of highly simplified construction and which is quite advantageous in that it may function not only as a door but as a landing platform. The side wires 21 and 22 of the door function not only as structural parts of the door but their extensions provide not only the hinges but the stops which limit the door to its horizontal fully open position.

Various changes may be made in the details of construction without departing from the spirit and scope of the invention as defined by the appended claims.

We claim:

1. A bird cage having a door opening bounded by a horizontal wire at the bottom thereof and vertical wires at the sides thereof which extend downwardly below the horizontal wire, a door having vertical wires at the sides thereof the lower ends of which are looped around the horizontal wire at the bottom of the door opening and then extend so as to be engageable with the vertical wires at the sides of the door opening below the horizontal wire whereby the door may hinge on the horizontal wire from closed to open position and when in fully open position may be self-supporting in a horizontal plane by reason of the mentioned engagement.

2. A bird cage having a door opening bounded by a horizontal wire at the bottom thereof and vertical wires at the sides thereof which extend downwardly below the horizontal wire, a door having vertical wires at the sides thereof the lower ends of which are looped around the horizontal wire at the bottom of the door opening and then extend so as to be engageable with the vertical wires at the sides of the door opening below the horizontal wire whereby the door may hinge on the horizontal wire from closed to open position and when in fully open position may be self-supporting in a horizontal plane by reason of the mentioned engagement, and means at the top of the door opening engageable with the top of the door for latching the door in closed position.

References Cited in the file of this patent

UNITED STATES PATENTS

| Number | Name | Date |
|---|---|---|
| 133,372 | Jewett | Nov. 26, 1872 |
| 806,918 | Roudabush | Dec. 12, 1905 |
| 2,042,517 | Ellis | June 2, 1936 |
| 2,584,643 | Vander Clute | Feb. 5, 1952 |